Dec. 9, 1969 MASAO KAWASHIMA ET AL 3,483,323

TIME WAVE EXTRACTING ARRANGEMENT IN A REGENERATIVE REPEATER OF A PULSE CODE MODULATION TRANSMISSION SYSTEM

Filed Dec. 21, 1966 2 Sheets-Sheet 2

United States Patent Office 3,483,323

Patented Dec. 9, 1969

3,483,323

TIME WAVE EXTRACTING ARRANGEMENT IN A REGENERATIVE REPEATER OF A PULSE CODE MODULATION TRANSMISSION SYSTEM

Masao Kawashima, Yokohama-shi, and Isao Fudemoto and Kiyoshi Tomimori, Kawasaki-shi, Japan, assignors to Fujitsu Limited, Kawasaki, Japan, a corporation of Japan Filed Dec. 21, 1966, Ser. No. 603,610
Claims priority, application Japan, Dec. 25, 1965, 40/80,588
Int. Cl. H04l 25/20
U.S. Cl. 178—70 8 Claims

ABSTRACT OF THE DISCLOSURE

In a time wave extracting arrangement of a regenerative repeater of a pulse code modulation transmission system, a clipper clips a signal at a determined threshold level under the control of a threshold voltage. An input signal having a symmetrical waveform is supplied to the clipper. A threshold voltage source connected to the clipper provides a threshold voltage to the clipper under the control of the input signal and the clipped wave derived from the clipper has a time constant which varies a minimum in amplitude regardless of variation of the amplitude and pattern density of the input signal.

BACKGROUND OF THE INVENTION

Field of the invention

The present invention relates to the regenerative repeater of a pulse code modulation transmission system. More particularly, the invention relates to a time wave extracting arrangement in the self-driving regenerative repeater of a pulse code modulation transmission system.

Description of the prior art

In a self-driving regenerative repeater of a pulse code modulation transmission system, the time wave, which is the basic repetitive component of the signal or pulse train received at and transmitted from said repeater, is extracted from the pulse train received at said repeater or from the square of the received pulse train. The time wave is then regenerated at the repeater by a narrow band filter or a pull-in oscillator the basic frequency of which is at the center of the band. The regenerated time wave is then transmitted from the repeater.

The regenerated time wave generally varies in proportion with the amplitude and the pattern density of the signal received at the repeater. Since the regenerated time wave is utilized as a synch or synchronizing signal, it must have a constant phase and amplitude level regardless of variation of the amplitude or pattern density of the signal received at the repeater. It is very difficult to extract the time wave from the wide range received signal with high precision by utilizing a narrow band filter, or to do so with small electric power consumption.

SUMMARY OF THE INVENTION

The principal object of the present invention is to provide a new and improved time wave extracting arrangement in a regenerative repeater of a pulse code modulation transmission system. The time wave extracting arrangement of the present invention overcomes the disadvantages of known time wave extracting arrangements and provides a time wave which has a constant phase and amplitude or level regardless of variation of the amplitude or pattern density of the signal received at the repeater. The electric power consumed by the time wave extracting arrangement of the present invention is small and the amplitude and phase variation of the time wave provided by such arrangement are reduced.

In accordance with the present invention, a time wave extracting arrangement of a regenerative repeater of a pulse code modulation transmission system comprises a clipper for clipping a signal at a determined threshold level under the control of a threshold voltage. An input supplies an input signal having a symmetrical waveform to the clipper. A threshold voltage source connected to the clipper provides a threshold voltage to the clipper under the control of the amplitude and/or pattern density of the input signal. An output derives a clipped wave from the clipper. The clipped wave has a time wave component which varies a minimum in amplitude regardless of variation of the amplitude and pattern density of the input signal.

In accordance with the method of the present invention, a time wave is extracted from an input signal of symmetrical waveform supplied to a regenerative repeater of a pulse code modulated transmission system by clipping an input signal at a threshold level controlled by the amplitude and/or pattern density of the input signal to provide a clipped wave having a time wave component which varies a minimum in amplitude regardless of variation of the amplitude and pattern density of the input signal.

BRIEF DESCRIPTION OF THE DRAWINGS

In order that the present invention may be readily carried into effect, it will now be described with reference to the accompanying drawings, wherein.

DESCRIPTION OF THE PREFERRED EMBODIMENT

Figure 1:
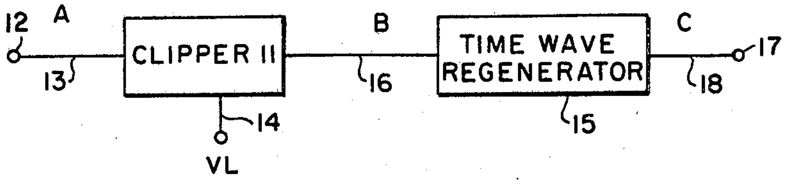
FIG. 1 is a block diagram of an embodiment of the time wave extracting arrangement of the present invention.

In FIG. 1, an input signal received by the regenerative repeater is preferably equalized and shaped at said repeater and is assumed to be equalized and shaped to provide an input signal A. The input signal A is supplied to the input of a clipper 11 via an input terminal 12 and a lead 13. The input signal A is shown in FIG. 2.

Figure 2:
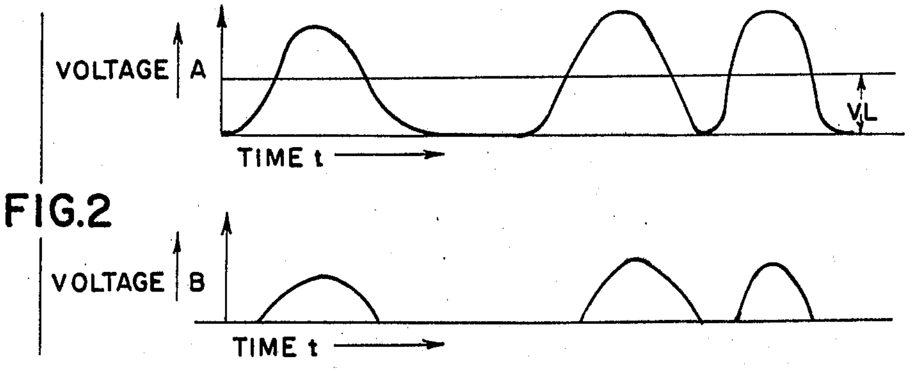
FIG. 2 is a graphical presentation of waveforms appearing in the arrangement of FIG. 1.

The clipper 11 clips the input signal A at a threshold level L, as shown in FIG. 2, due to a threshold voltage VL applied to said clipper via a lead 14. The threshold voltage VL may be provided by a suitable source of threshold voltage. The clipped wave or signal B provided by the clipper 11 is shown in FIG. 2 and is applied to a time wave regenerator 15 via a lead 16 which connects the output of said clipper to the input of said time wave regenerator.

The time wave regenerator 15 provides the time wave C from the clipped wave B fed to its input and provides said time wave at an output terminal 17 via a lead 18. The time wave component of the clipped wave B varies in accordance with the threshold voltage VL.

Figure 3:
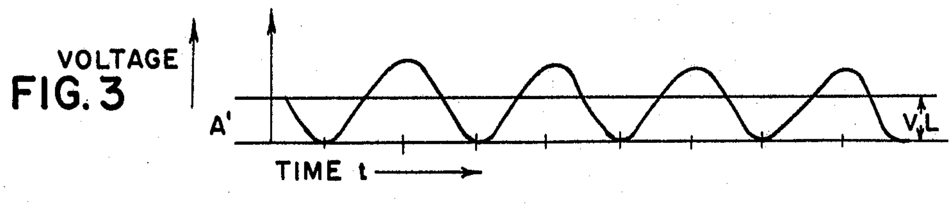
FIG. 3 is a graphical presentation of a cosine-squared input wave form for the arrangement of FIG. 1.
Figure 4:
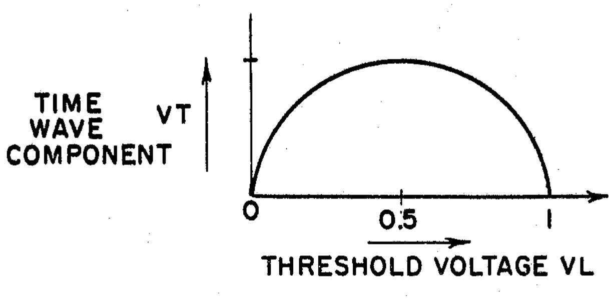
FIG. 4 is a graphical presentation of the time wave component relative to the threshold voltage.

The input signal A′ may comprise a cosine-squared waveform, as shown in FIG. 3. The time wave component VT is derived from the cosine-squared input signal A′ of FIG. 3 and is shown in FIG. 4, wherein it is plotted against the threshold voltage VL. The relation of the time wave component VT and the threshold voltage VL is defined by the equation $$VT=\frac{1}{12\pi}(2VL-VL^2)^{3/2}$$

As illustrated by the foregoing equation and FIG. 4, if the threshold voltage VL increase from 0 to 0.5, the time wave component VT increases in an exponential function from 0 to a maximum magnitude, and if the threshold voltage VL then increases further from 0.5 to 1.0, the time wave component VT decreases in an exponential function from its maximum magnitude to 0.

In each of FIGS. 2 and 3, the abscissa represents the time $t$ and the ordinate represents the voltage A and B and A′, respectively. In FIG. 4, the abscissa represents the threshold voltage VL and the ordinate represents the time wave component VT.

When the unit waveforms of the input signal, which correspond to the unit codes of said input signal, are symmetrical with respect to lines parallel to the ordinate of FIG. 2, such symmetrical waveforms being identified as symmetrical waveforms, the relative phase of the input signal A and the output time wave C is constant regardless of the threshold voltage VL. The time wave C is derived or extracted and regenerated from the clipped wave B.

Since the output time wave C is constant regardless of the threshold voltage VL, the threshold voltage VL may be varied in accordance with the amplitude or pattern density of the input signal A, and the time wave may be derived and regenerated from the clipped wave B provided by clipping the input signal at the threshold voltage, and the level or amplitude variation of the time wave C may be reduced or compressed by the amplitude and/or pattern density of the input signal A. If the threshold voltage is controlled by the amplitude of the input signal, the source of threshold voltage may comprise an inverter rectifier-type bias voltage circuit. If the threshold voltage is controlled by the pattern density of the input signal, the source of threshold voltage may comprise a self-bias voltage circuit.

Figure 5:
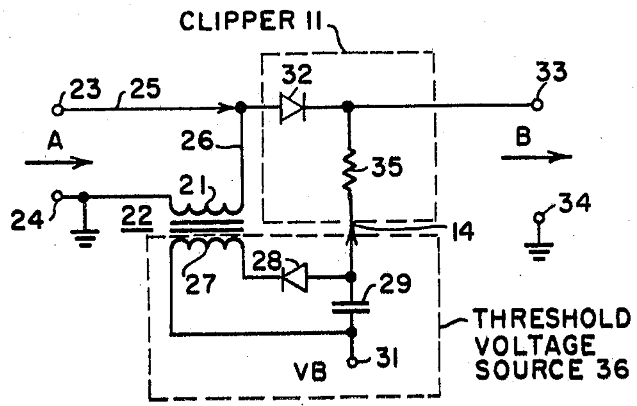
FIG. 5 is a circuit diagram of an embodiment of the time wave extracting arrangement of the present invention which reduces amplitude variation of the time wave component caused by amplitude variation of the input signal.

The time wave extracting arrangement of FIG. 5 compresses or reduces the level or amplitude variation of the time wave component VT of the clipped wave B caused by amplitude variation of the input signal A. In FIG. 5, the input signal A is supplied to a primary winding 21 of a transformer 22 via a pair of input terminals 23 and 24 and a lead 25 and a lead 26. A secondary winding 27 of the transformer 22 is connected in series circuit arrangement with a first diode 28. The series circuit arrangement 27, 28 is connected across a capacitor 29. A suitable bias voltage VB is applied to the capacitor 29 via an input terminal 31.

The input terminal 23 is connected via the lead 25 and a second diode 32 to an output terminal 33. The output terminal 33 cooperates with an output terminal 34. A resistor 35 is connected in series with the capacitor 29 via a lead 36 and is connected in parallel with the second diode 32 via the lead 14.

The secondary winding 27, the first diode 28 and the capacitor 29 comprises an inverter rectifier-type bias circuit or threshold voltage source 36 for providing the threshold voltage VL. The second diode 32 and the resistor 35 comprise the clipper 11 (FIG. 1). The threshold voltage is applied by the threshold voltage source 36 to both plates of the capacitor 29. The reduction or compression of the amplitude or level variation of the time wave component VT (FIG. 4) of the clipped signal B (FIG. 2) may be varied relative to the amplitude variation of the input signal A (FIG. 2) by variation of the winding ratio of the primary and secondary windings 21 and 27 of the transformer 22, and by variation of the ratio of the amplitude of the input signal A to the inverter rectifier bias voltage or threshold voltage VL.

In an operating embodiment of the circuit of FIG. 5, when the input signal A′ is a cosine-squared waveform (FIG. 3) and the ratio of the amplitude of said input signal to the bias or threshold voltage VL is 0.8, if the amplitude of said input signal increases by 14 decibels, the time wave component VT (FIG. 4) of the clipped wave B (FIG. 2) increases in amplitude by only about 8 decibels so that the variation of the level or amplitude of the time component is reduced by about 6 decibels. In a known time wave extracting arrangement, there would be no such reduction in the variation of the amplitude of the time wave.

Figure 6:
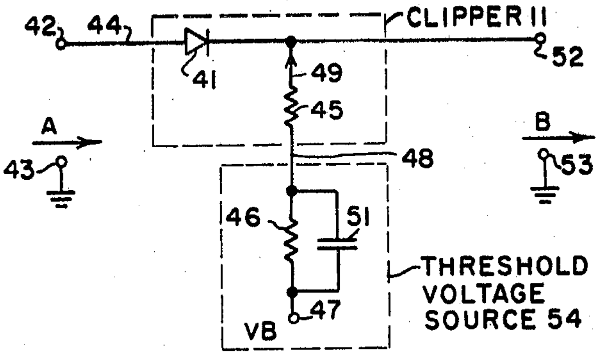
FIG. 6 is a circuit diagram of an embodiment of the time wave extracting arrangement of the present invention which reduces amplitude variation of the time wave component caused by pattern density variation of the input signal.

The time wave extracting arrangement of FIG. 6 reduces the amplitude variation of the time wave component VT of the clipped wave B caused by variation of the pattern density of the input signal A. In FIG. 6, the input signal A is supplied to a diode 41 via a pair of input terminals 42 and 43 and a lead 44. A first resistor 45 is connected in series circuit arrangement with a second resistor 46 and an input terminal 47 to which a suitable bias voltage VB is applied via a lead 48.

The series circuit arrangement 45, 46, 47 is connected in parallel with the diode 41 via a lead 49. A capacitor 51 is connected across the second resistor 46. The input terminal 42 is connected via the lead 44 and the diode 41 to an output terminal 52. The output terminal 52 cooperates with an output terminal 53.

The diode 41 and the first resistor 45 comprise the clipper 11 (FIG. 1), similarly to FIG. 5. The second resistor 46 and the capacitor 51 comprise a self-bias circuit or threshold voltage source 54 for providing the threshold voltage VL. The reduction or compression of the amplitude or level variation of the time wave component VT (FIG. 4) of the clipped signal B (FIG. 2) may be varied by variation of the ratio of the resistance of the resistor 45 to the resistance of the resistor 46, and by adjustment of the variation of the self-bias or threshold voltage VL caused by variation of the pattern density of the input signal A.

In each of FIGS. 5 and 6, the input signal A is applied to the pair of input terminals and the clipped wave B is provided at the pair of output terminals.

Figure 7:
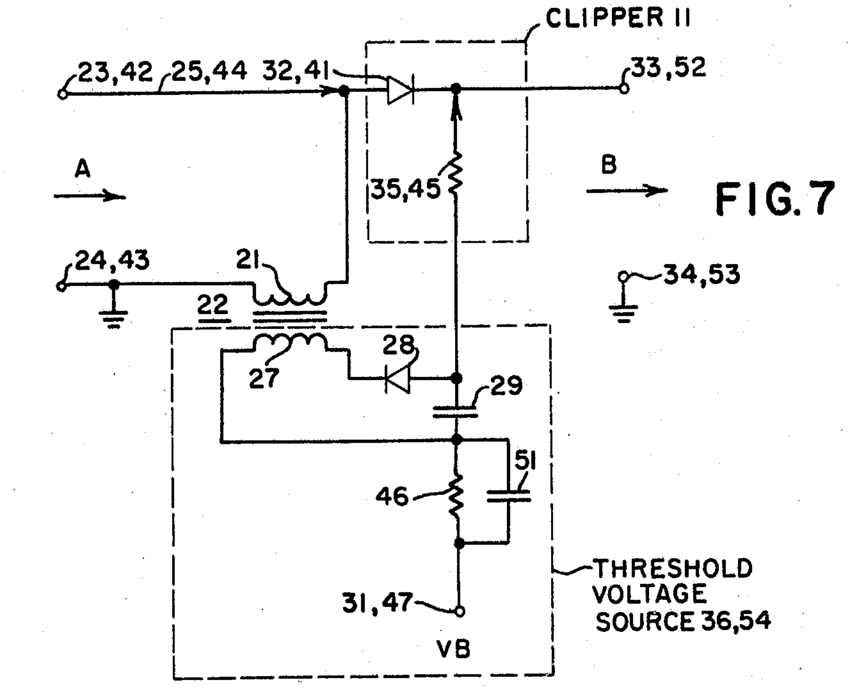
FIG. 7 is a circuit diagram of an embodiment of the time wave extracting arrangement of the present invention which reduces amplitude variation of the time wave component caused by both amplitude variation and pattern density variation of the input signal.

The time wave extracting arrangement of FIG. 7 is a combination of the arrangements of FIGS. 5 and 6 and reduces the amplitude variation of the time wave component VT of the clipped wave B caused by both amplitude variation of the input signal A and variation of the pattern density of the input signal A. The components of FIG. 7 are thus the corresponding components of FIG. 5 and FIG. 6 and are similarly labelled. The components of FIG. 7 function in the same manner as the corresponding components of FIGS. 5 and 6.

We claim:

1. In a regenerative repeater of a pulse code modulation transmission system, a time wave extracting arrangement comprising clipper means for clipping a signal at a determined threshold level under the control of a threshold voltage;

input means for supplying an input signal having a symmetrical waveform to said clipper means;

threshold voltage means connected to said clipper means for providing a threshold voltage to said clipper means under the control of said input signal; and output means for deriving a clipped wave from said clipper means, said clipped wave having a time wave component which has a minimum variation in amplitude regardless of variation of the amplitude and pattern density of said input signal.

2. A time wave extracting arrangement as claimed in claim 1, wherein said threshold voltage means provides a threshold voltage to said clipper means having a magnitude dependent upon the amplitude and pattern density of said input signal.

3. A time wave extracting arrangement as claimed in claim 1, wherein said threshold voltage means provides a threshold voltage to said clipper means having a magnitude dependent upon the amplitude of said input signal.

4. A time wave extracting arrangement as claimed in claim 1, wherein said threshold voltage means provides a threshold voltage to said clipper means having a magnitude dependent upon the pattern density of said input signal.

5. A method of extracting a time wave from an input signal of symmetrical waveform supplied to a regenerative repeater of a pulse code modulation transmission system, said method comprising clipping said input signal at a threshold level controlled by said input signal to provide a clipped wave having a time wave component which varies a minimum in amplitude regardless of variation of the amplitude and pattern density of said input signal.

6. A method as claimed in claim 5, wherein said input signal is clipped at a threshold level dependent upon the amplitude and pattern density of said input signal.

7. A method as claimed in claim 5, wherein said input signal is clipped at a threshold level dependent upon the amplitude of said input signal.

8. A method as claimed in claim 5, wherein said input signal is clipped at a threshold level dependent upon the pattern density of said input signal.

References Cited

UNITED STATES PATENTS

| | | | |
|---|---|---|---|
| 2,676,204 | 4/1954 | Snijders | 178—70 |
| 3,327,230 | 6/1967 | Konian | 328—164 |

THOMAS A. ROBINSON, Primary Examiner

MARSHALL M. CURTIS, Assistant Examiner

U.S. Cl. X.R.

328—164